United States Patent [19]

Möckli

[11] Patent Number: 4,847,364
[45] Date of Patent: Jul. 11, 1989

[54] METHINE-AZO COMPOUNDS CONTAINING CYCLIC CATIONIC AMMONIUM GROUPS AND OPEN-CHAIN COUPLING COMPONENTS

[76] Inventor: Peter Möckli, Sandgrubenstrasse 13, 4124 Schöonenbuch, Switzerland

[21] Appl. No.: 62,418

[22] Filed: Jun. 16, 1987

[30] Foreign Application Priority Data

Aug. 22, 1984 [CH] Switzerland .......................... 4018/84

[51] Int. Cl.$^4$ ...................... C09B 44/00; C09B 44/02; D06P 1/41
[52] U.S. Cl. .................... 534/605; 534/604; 534/606; 534/612; 534/741; 534/742; 544/249; 546/101; 546/176; 546/181; 546/329; 548/152; 548/235; 548/239; 548/328
[58] Field of Search ................ 534/604, 605, 606, 612

[56] References Cited

U.S. PATENT DOCUMENTS

| | | | |
|---|---|---|---|
| 3,185,538 | 5/1965 | Voltz et al. | 534/605 X |
| 3,331,381 | 7/1967 | Raue et al. | 534/606 X |
| 3,338,660 | 8/1967 | Biedermann | 534/603 X |
| 3,933,786 | 1/1976 | Peter et al. | 534/606 |
| 3,956,264 | 5/1976 | Raue et al. | 534/606 |
| 4,557,732 | 12/1985 | Hahnke et al. | 534/605 X |

FOREIGN PATENT DOCUMENTS

| | | | |
|---|---|---|---|
| 2620790 | 11/1976 | Fed. Rep. of Germany | 534/605 |
| 875995 | 8/1961 | United Kingdom | 534/605 |
| 896681 | 5/1962 | United Kingdom | 534/604 |
| 916697 | 1/1963 | United Kingdom | 534/605 |
| 944303 | 2/1963 | United Kingdom | 534/605 |
| 1213394 | 12/1970 | United Kingdom | 534/606 |
| 1214394 | 12/1970 | United Kingdom | 534/606 |
| 1221821 | 2/1971 | United Kingdom | 534/605 |

OTHER PUBLICATIONS

Voltz et al II, Chemical Abstracts, vol. 61, 12136 to 12137 (1964).
2,620,790 11-1976, W. Germany, Froy et al., 534-605, 0/11.
Voltz et al., II, Chemical Abstracts, vol. 61, 12136-2137 (1964).

Primary Examiner—Floyd D. Higel
Attorney, Agent, or Firm—Wenderoth, Lind & Ponack

[57] ABSTRACT

Methine-azo compounds of the formula

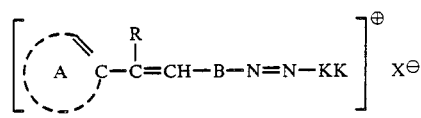

in which
A is the complement to a heterocyclic 5- or 6-membered ring which has a quaternized N atom as a ring member, which can contain further hetero atoms and which can be substituted or/and be fused with carbocyclic or heterocyclic rings,
R is hydrogen, cyano or $C_2$–$C_3$-alkylene which is bonded to an N atom of ring A to form a 5- or 6-membered ring,
B is substituted or unsubstituted phenylene or naphthylene,
$X^\ominus$ is an anion and
KK is the radical of an open-chain coupling component which contains active methylene groups, except that, if A is the complement to a pyridinium ring, KK cannot be the radical of acetoacetanilide which is unsubstituted or alkyl-substituted in the aniline ring.

They are suitable for use as dyes for dyeing and printing cationically dyeable substrates, in particular paper.

1 Claim, No Drawings

METHINE-AZO COMPOUNDS CONTAINING CYCLIC CATIONIC AMMONIUM GROUPS AND OPEN-CHAIN COUPLING COMPONENTS

This application is a continuation, of now abandoned application Ser. No. 767,913, filed Aug. 21, 1985.

The invention relates to novel methine-azo compounds, to processes for their preparation, and their use as dyes for dyeing and printing cationically dyeable substrates, especially paper.

The novel compounds according to the invention have the formula

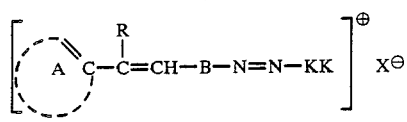 (I)

in which

A is the complement to a heterocyclic 5- or 6-membered ring which has a quaternised N atom as a ring member, which can contain further hetero atoms and which can be substituted or/and be fused with carbocyclic or heterocyclic rings, R is hydrogen, cyano or $C_2$-$C_3$-alkylene which is bonded to an N atom of ring A to form a 5- or 6-membered ring, B is substituted or unsubstituted phenylene or naphthylene, $X^\ominus$ is an anion and KK is the radical of an open-chain coupling component which contains active methylene groups, except that, if A is the complement to a pyridinium ring, KK cannot be the radical of acetoacetanilide which is unsubstituted or alkyl-substituted in the aniline ring.

In particularly noteworthy compounds of the formula (I), A, R, B and $X^\ominus$ are as defined in the formula (I) and KK is the radical of an open-chain coupling component which contains active methylene groups, except for the radical of unsubstituted acetoacetanilide or of acetoacetanilide which is alkyl-substitute the aniline ring.

A and the

configuration together are a heterocyclic 5- or 6- membered ring which contains a quaternized N atom as a ring member. This ring can also contain further hetero atoms (N, O or S), for example one or two, in particular one. This ring can be fused with one or more heterocyclic or preferably carbocyclic rings, in particular a benzo or naphtho ring. The stated rings and ring systems can also carry further substituents, except for the substituent on the N atom which leads to quaternisation thereof. Examples of such substituents are nitro, halogen, cyano, $C_1$-$C_4$-alkyl, $C_1$-$C_4$-alkoxy, acetylamino and dimethylamino. The substituent on the quaternised nitrogen atom can be for example phenyl, $C_1$-$C_8$-alkyl, $C_2$-$C_8$-alkenyl or $C_3$-$C_6$-cycloalkyl, it being possible for the alkyl, alkenyl or cycloalkyl chain to be interrupted by oxygen or nitrogen atoms and/or be substituted by halogen, cyano, hydroxyl, alkoxy, phenyl, phenoxy, dialkylamino, trialkylammonium, acetylamino, alkylcarbonyl, alkoxycarbonyl, alkylsulfonyl, phenylsulfonyl, benzylsulfonyl, alkylsulfonamido, phenylsulfonamido, benzylsulfonamido, alkylcarbonylamino, benzoyl, benzoylamino, alkylcarbamoyl, phenylcarbamoyl, benzylcarbamoyl, alkylcarbamoyloxy, phenylcarbamoyloxy or benzylcarbamoyloxy.

A is for example the complement to a pyrimidine, pyridine, quinoline, thiazole, imidazole, oxazole or pyrrole ring, it being possible for these rings, which are quaternised at the N atom, to be fused with carbocyclic rings, preferably with a benzo or naphtho ring, and to be further substituted. Examples of substituents on the quaternised N atom and of additional substituents are listed in the preceding paragraph.

In practically important compounds of the formula (I), A is the complement to one of the following rings:

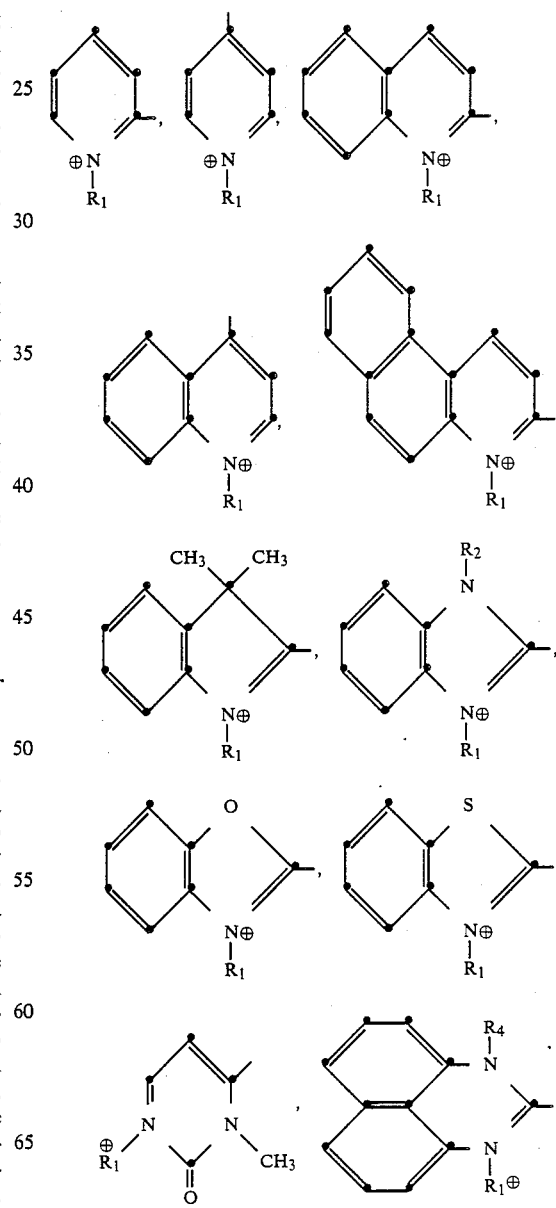

-continued

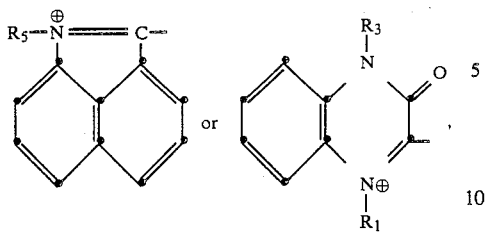

it being possible for these rings to be substituted, in addition to the substituents, $R_1$–$R_5$, by nitro, halogen, cyano, $C_1$–$C_4$-alkyl, $C_1$–$C_4$-alkoxy, acetylamino or dimethylamino, and in which $R_1$, $R_2$, $R_3$ and $R_4$, independently of one another, are $C_1$–$C_8$-alkyl, $C_2$–$C_8$-alkenyl, or $C_3$–$C_6$-cycloalkyl, it being possible for the alkyl, alkenyl or cycloalkyl chain to be interrupted by oxygen or nitrogen atoms and/or be substituted by halogen, cyano, hydroxyl, alkoxy, phenyl, phenoxy, dialkylamino, trialkylammonium, acetylamino, alkylcarbonyl, alkoxycarbonyl, alkylsulfonyl, phenylsulfonyl, benzylsulfonyl, alkylsulfonamido, phenylsulfonamido, benzylsulfonamido, alkylcarbonylamino, benzoyl, benzoylamino, alkylcarbamoyl, phenylcarbamoyl, benzylcarbamoyl, alkylcarbamoyloxy, phenylcarbamoyloxy or benzylcarbamoyloxy, and $R_5$ is phenyl or is defined as $R_1$.

A is in particular the complement to one of the following rings:

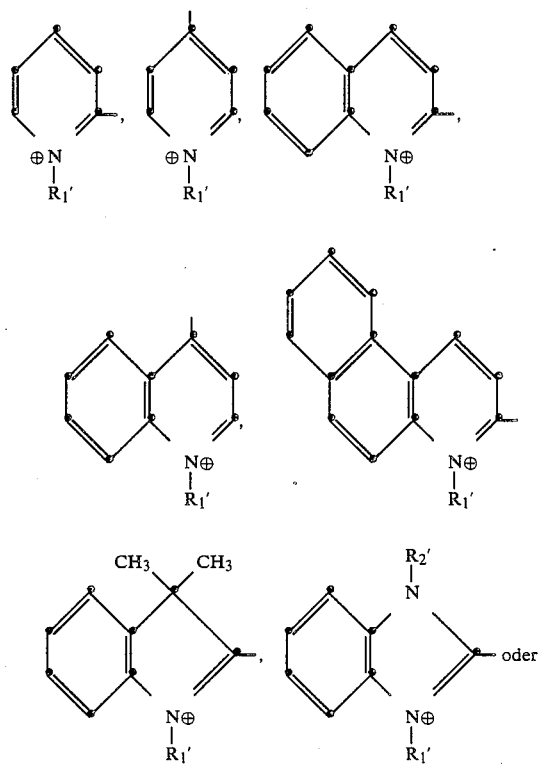

-continued

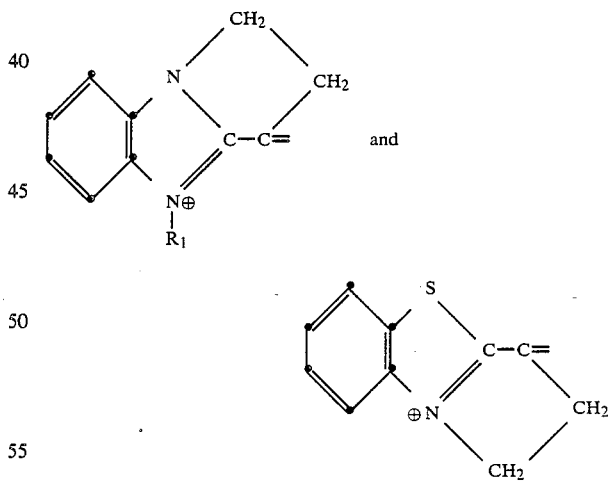

in which $R'_1$ and $R'_2$, independently of each other, are $C_1$–$C_4$-alkyl benzyl, cyclohexyl, hydroxyalkyl or $C_3$–$C_4$-alkenyl and the stated rings are otherwise unsubstituted or substituted by halogen, cyano, $C_1$–$C_4$-alkyl, $C_1$–$C_4$-hydroxyalkyl or $C_1$–$C_4$-alkoxy.

A is particularly preferably the complement to a pyridine ring which can be substituted and/or fused with carbocyclic rings, preferred fused-on rings and substituents being mentioned above. A is in particular the complement to a pyridine ring whose N atom is quaternised with $C_1$–$C_4$-alkyl, especially methyl, and which can be additionally substituted by one or two $C_1$–$C_4$-alkyl groups, the tank to the

group being effected in the 2- or 4-position.

In likewise noteworthy compounds of the formula (I), A is the complement to a pyridinium or 3,3-dimethylindoleninium ring of the above formulae in which $R_1$ is methyl.

A $C_2$–$C_3$-alkylene group R which is bonded to an N atom of ring A to form a 5- or 6-membered ring has for example the following structures:

and similar. However, preferably R is hydrogen.

Examples of possible substituents in the phenylene or naphthylene ring B are: $C_1$–$C_4$-alkyl (for example methyl, ethyl, n- and iso-propyl), $C_1$–$C_4$-alkoxy (for example methoxy, ethoxy, n-butoxy, dimethylaminoethoxy, trimethylaminoethoxy), halogen (for example fluorine, chlorine, bromine), $SO_3H$ and acylamino (for example acetylamino). In preferred compounds, B is unsubstituted phenylene, in particular 1,4-phenylene.

KK is the radical of an open-chain coupling component which contains one or more, preferably one, active methylene group(s) and which is customary in azo chemistry, in particular in the chemistry of azo dyes.

KK is for example the radical of a coupling component from the group of the derivatives of acetoacetic acid, of malonic acid or of cyanoacetic acid, especially the radical of an acetoacetylamide or acetoacetyl ester coupling component.

Examples of open-chain coupling components having an active methylene group are: (a) esters and amides of acetoacetic acid: such esters and amides can be easily prepared by reacting OH- and NH-containing compounds with diketene, as described for example in Houben-Weyl, Methoden der organischen Chemie [Methods of organic chemistry], volume 7, part 4, oxygen compounds II. Such coupling components have for example the formula:

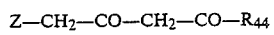

Z—CH$_2$—CO—CH$_2$—CO—R$_{44}$ in which R$_{44}$ is substituted or substituted alkoxy having 1-8 carbon atoms or cycloalkoxy, substituted or unsubstituted benzyloxy or phenoxy which can be substituted by C$_1$–C$_4$-alkyl, C$_1$–C$_4$-alkoxy, halogen, acylamino, carboxamido, sulfonamido, dialkylamino, C$_1$–C$_4$-alkylcarbonyl, C$_1$–C$_4$-alkoxycarbonyl, OH or phenyl.

R$_{44}$ is also a radical of the formula

in which R$_{45}$ is C$_1$–C$_4$-alkyl or preferably hydrogen and R$_{46}$ is hydrogen, substituted (for example by halogen, OH, alkoxy or amino) or unsubstituted C$_1$–C$_8$-alkyl or cycloalkyl or substituted or unsubstituted benzyl or a phenyl radical of the formula

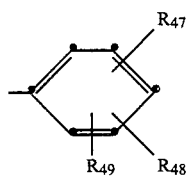

in which R$_{47}$ is hydrogen, C$_1$–C$_4$-alkyl, C$_1$–C$_4$-alkoxy, halogen, cyano, nitro, OH, dialkylamino, phenylamino,

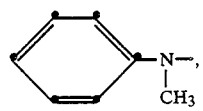

phenyl acylamino, substituted or unsubstited carboxamido, substituted or unsubstituted sulfonamido, C$_1$–C$_4$-alkylcarbonyl, C$_1$–C$_4$-alkoxycarbonyl, C$_1$–C$_4$-alkylsulfonyl, a radical of the formula —(CH$_2$)$_w$—K-⊕An⊖ from DE-A-No. 3,133,360, where K⊕ is an aliphatic or aromatic ammonium group, for example

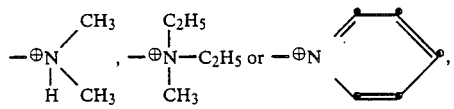

An⊖ is an anion, and w is 1 or 2, a radical of the formula

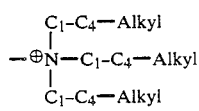

from DE-A-3,231,398, preferably

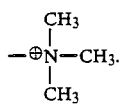

R$_{48}$, independently of R$_{47}$, is hydrogen, C$_1$–C$_4$-alkyl, C$_1$–C$_4$-alkoxy or halogen; R$_{49}$ independently of R$_{47}$ and R$_{48}$, is hydrogen, halogen or C$_1$–C$_4$-alkyl.

R$_{46}$ can also be, together with R$_{45}$ and optionally with the inclusion of further hetero atoms, a 5- or 6-membered saturated or unsaturated ring, for example of the formula

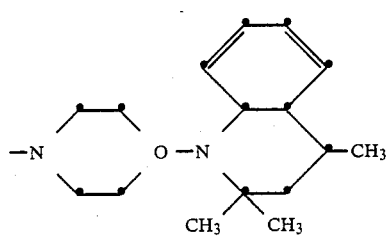

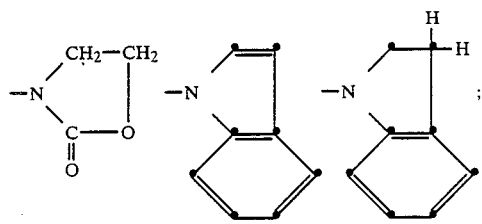

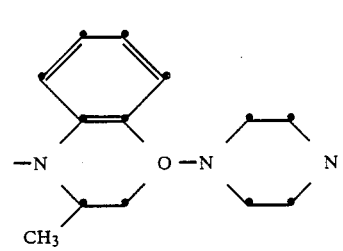

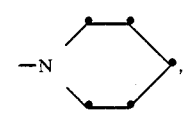

R$_{44}$ is also defined as a heterocyclic amino, for example of the formula

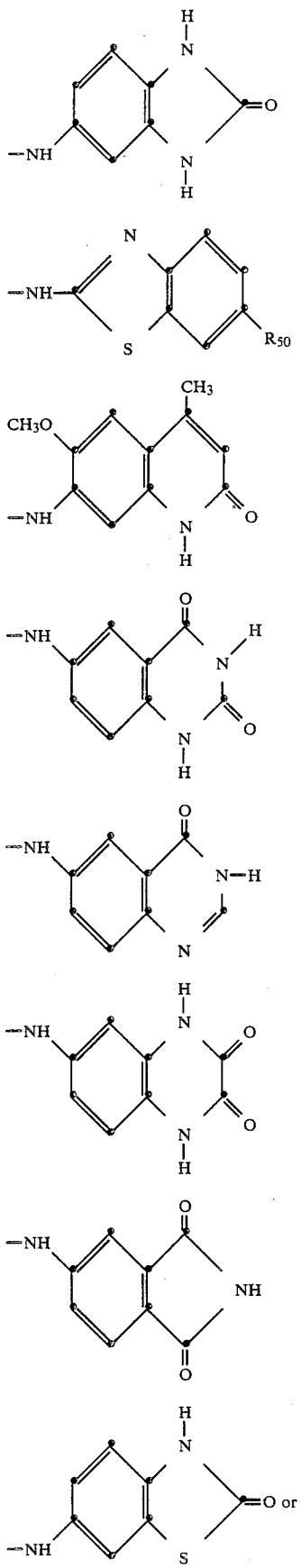

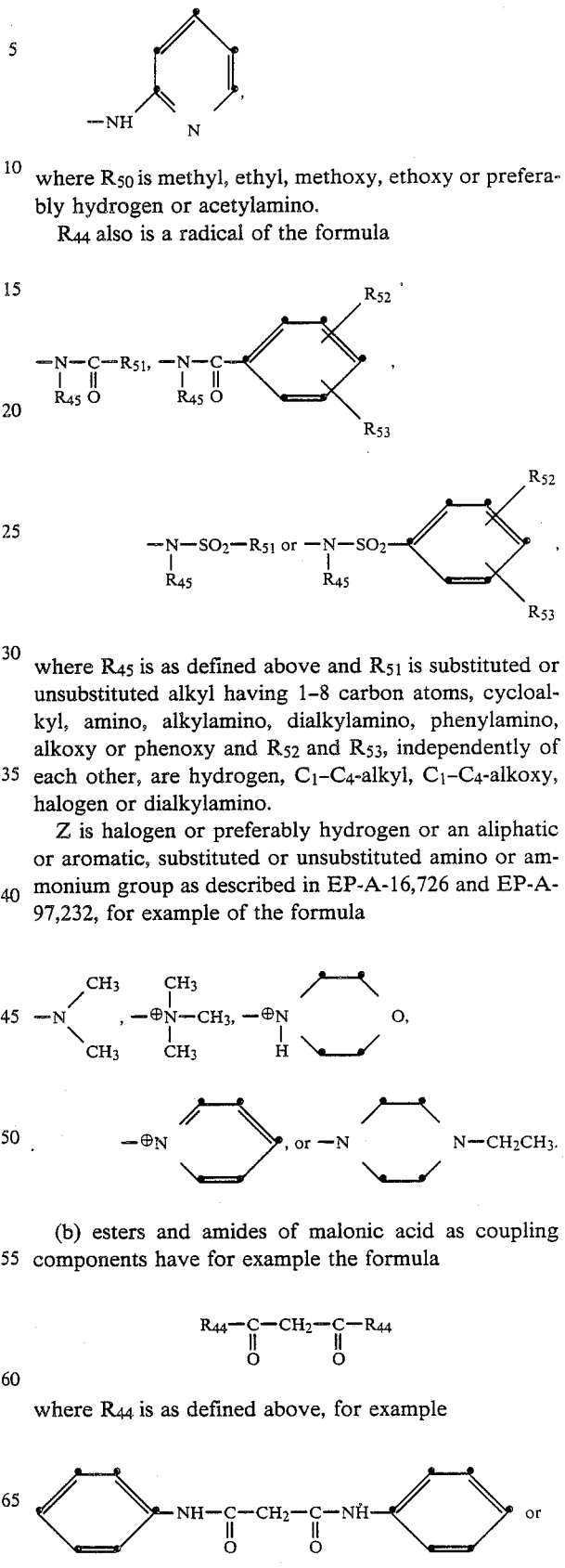

where $R_{50}$ is methyl, ethyl, methoxy, ethoxy or preferably hydrogen or acetylamino.

$R_{44}$ also is a radical of the formula where $R_{45}$ is as defined above and $R_{51}$ is substituted or unsubstituted alkyl having 1-8 carbon atoms, cycloalkyl, amino, alkylamino, dialkylamino, phenylamino, alkoxy or phenoxy and $R_{52}$ and $R_{53}$, independently of each other, are hydrogen, $C_1$-$C_4$-alkyl, $C_1$-$C_4$-alkoxy, halogen or dialkylamino.

Z is halogen or preferably hydrogen or an aliphatic or aromatic, substituted or unsubstituted amino or ammonium group as described in EP-A-16,726 and EP-A-97,232, for example of the formula (b) esters and amides of malonic acid as coupling components have for example the formula where $R_{44}$ is as defined above, for example -continued

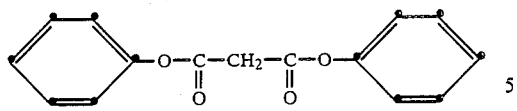

(c) esters and amides of cyanoacetic acid as coupling components have for example the formula

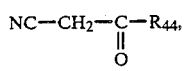

where $R_{44}$ is as defined above, for example

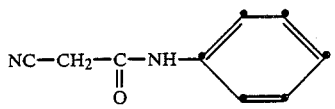

As far as in the above definitions alkyl groups, as such or as part of assembled groups, are referred to as "substituted or unsubstituted" examples of possible substituents, unless otherwise stated, are: hydroxyl, cyano, halogen (for example Cl, Br), $C_1$-$C_4$-alkoxy, phenyl (which can be substituted 1-3 times by halogen, methyl or methoxy), amino, alkylamino or dialkylamino. Again, unless otherwise stated, alkyl groups have, as such or as part of assembled groups, preferably 1–8, in particular 1–4, C atoms, and cycloalkyl groups preferably have 5 or 6 C atoms.

In noteworthy compounds of the formula (I), KK is the radical of a coupling component of the formula Z—CH$_2$—CO—CH$_2$—CO—R$_6$,
R$_6$—CO—CH$_2$—CO—R$_6$ or
NC—CH$_2$—CO—R$_6$ in which Z is hydrogen, halogen or a substituted or unsubstituted aliphatic, cycloaliphatic or aromatic amino or ammonium group, in particular of the formula

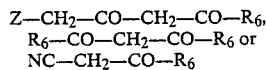

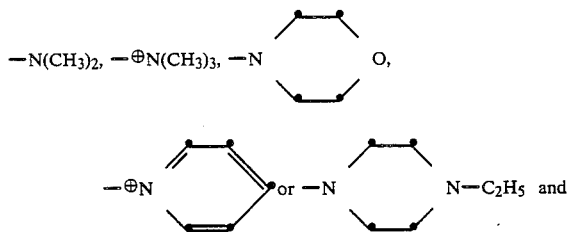

$R_6$ is substituted or unsubstituted alkoxy, cycloalkoxy, benzyloxy or phenoxy, unsubstituted or monosubstituted or disubstituted amino or a 5- or 6-membered cyclic saturated or unsaturated amino group, the radicals of coupling components of the formula

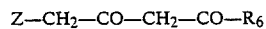   Z—CH$_2$—CO—CH$_2$—CO—R$_6$   (II)

being preferred.

In particular KK is the radical of a coupling component of the formula II in which $R_6$ is alkoxy having 1-8 carbon atoms or cycloalkoxy, benzyloxy or phenoxy, the stated groups being unsubstituted or substituted by $C_1$-$C_4$-alkyl, $C_1$-$C_4$-alkoxy, halogen, acylamino, carboxamido, sulfonamido, dialkylamino, $C_1$-$C_4$-alkylcarbonyl, $C_1$-$C_4$-alkoxycarbonyl, hydroxyl or phenyl; or $R_6$ is a radical of the formula

where $R_7$ is $C_1$-$C_4$-alkyl or hydrogen and $R_8$ is substituted or unsubstituted $C_1$-$C_8$-alkyl, cycloalkyl, substituted or unsubstituted benzyl or a phenyl radical of the formula

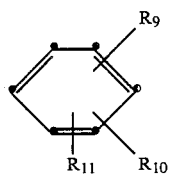

in which $R_9$ is hydrogen, $C_1$-$C_4$-alkyl, $C_1$-$C_4$-alkoxy, halogen, cyano, nitro, dialkylamino, phenylamino,

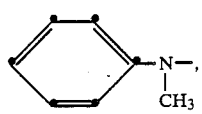

phenyl, acylamino, carboxamido, sulfonamido, $C_1$-$C_4$-alkylcarbonyl, $C_1$-$C_4$-alkoxycarbonyl, $C_1$-$C_4$-alkylsulfonyl, a radical of the formula —(CH$_2$)$_w$—K$\oplus$An$\ominus$, where K$\oplus$ is an aliphatic or aromatic ammonium group, An$\ominus$ is an anion and w is 1 or 2; or a radical of the formula

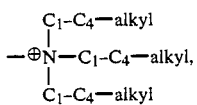

$R_{10}$ is hydrogen, $C_1$-$C_4$-alkoxy or halogen and $R_{11}$ is hydrogen, halogen or $C_1$-$C_4$-alkyl; or where $R_8$, together with R7 and optionally with the inclusion of further hetero atoms, is a 5- or 6-membered, saturated or unsaturated ring; or in which $R_6$ is an amino group which is substituted by a substituted or unsubstituted heterocyclic ring or is a group of the formula

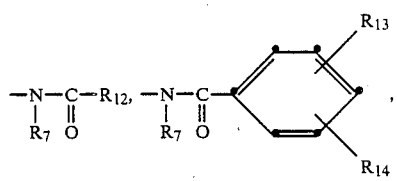

-continued

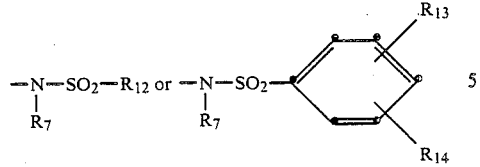

in which

R₇ is as defined above and

R₁₂ is substituted or unsubstituted $C_1-C_8$-alkyl, cycloalkyl, amino, alkylamino, dialkylamino, phenylamino, alkoxy or phenoxy and R₁₃ and R₁₄, independently of each other, are hydrogen, $C_1-C_4$-alkyl, $C_1-C_4$-alkoxy, halogen or dialkylamino.

R₇ is preferably hydrogen. As far as in the above definitions alkyl groups, as such or as part of assembled groups, are referred to as "substituted or unsubstituted" examples of possible substituents, unless otherwise stated, are: hydroxyl, cyano, halogen (for example Cl, Br), $C_1-C_4$-alkoxy, phenyl (which can be substituted 1–3 times by halogen, methyl or methoxy), amino, alkylamino or dialkylamino. Again, unless otherwise stated, alkyl groups have, as such or as part of assembled groups, preferably 1–8 in particular 1–4, C atoms, and cycloalkyl groups preferably have 5 or 6 C atoms.

A substituted alkyl radical R₈ preferably carries as substituents halogen, hydroxyl, alkoxy or amino. A benzyl radical (for example R₈) can have the same substituents as described above for a phenyl radical, in particular 1–3 substituents from the group comprising $C_1-C_4$-alkyl, $C_1-C_4$-alkoxy, halogen, hydroxyl, amino, alkylamino and alkylamino. Suitable radicals of the formula $-(CH_2)_w-K\oplus An\ominus$ are in particular those described in DE-A-3,133,360. Examples of $K\oplus$ are

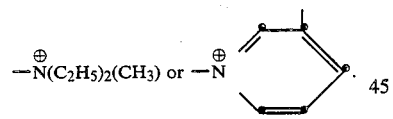

Preferred 5- or 6-membered rings as substituent $R^8$ are those of the formula

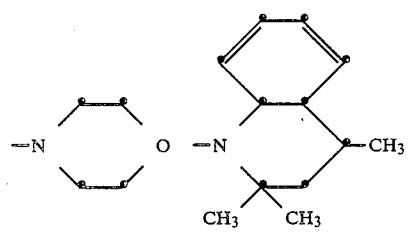

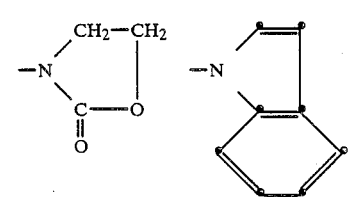

-continued

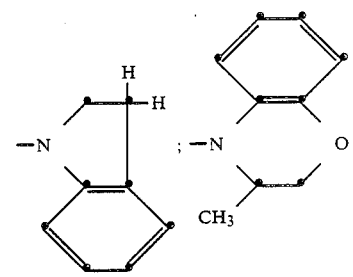

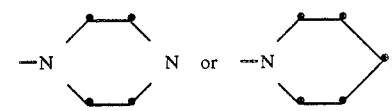

Examples of amino groups which are substituted by substituted or unsubstituted heterocyclic radicals and which are used as substituents R₆ are those of the formula $-NR_{14}$ in which R₁₄ is a substituted or unsubstituted mononuclear or binuclear heterocyclic radical which contain 5- or 6-membered, carbocyclic and heterocyclic rings having 1 or 2 N, O or/and S atoms as ring members, in particular those of the formula

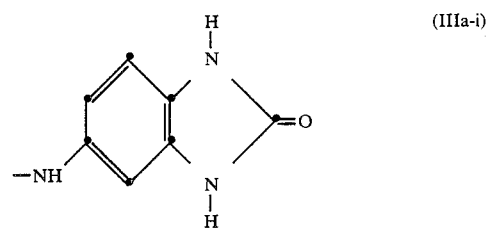
(IIIa-i)

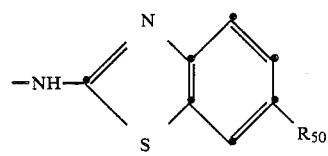

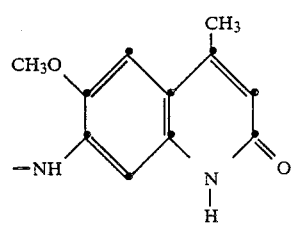

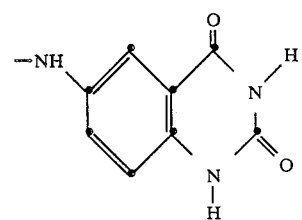

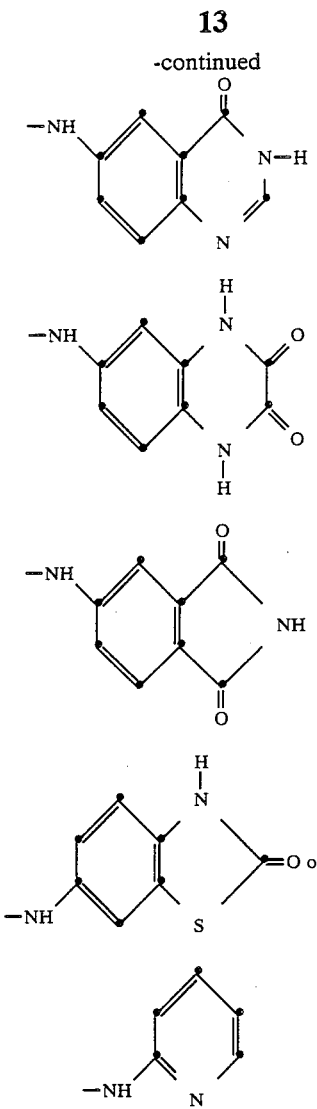

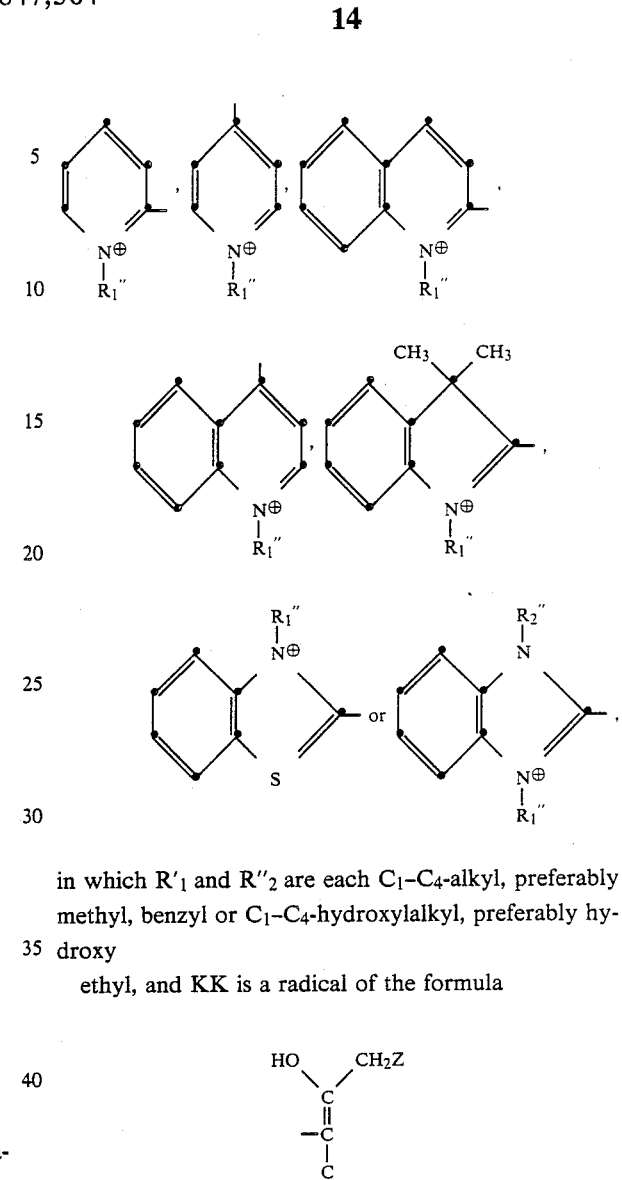

where $R^{50}$ is methyl, ethyl, methoxy, ethoxy or preferably hydrogen or acetylamino.

In the abovementioned coupling components derived from derivatives of acetoacetic acid, Z is preferably hydrogen. In the entire description, halogen is to be understood as meaning F, Cl, Br or I, preferably Cl or Br.

In the coupling components of the formula (II), $R_6$ is in particular $$-N\begin{matrix}R_7\\R_8\end{matrix}$$

or $-NH-R_{14}$, where $R_7$ and $R_8$ are as defined are above and $R_{14}$ is a substituted or unsubstituted mononuclear or binuclear heterocyclic radical which contains 5- or 6-membered, carbocyclic and heterocyclic rings having 1 or 2 N, O or/and S atoms as ring members. Examples of such rings are those of the formulae (IIIa-i).

Of particular practical importance are those compounds of the formula (I) in which R is hydrogen, B is phenylene, A is the complement to a ring of the formula in which $R'_1$ and $R''_2$ are each $C_1$-$C_4$-alkyl, preferably methyl, benzyl or $C_1$-$C_4$-hydroxylalkyl, preferably hydroxy ethyl, and KK is a radical of the formula

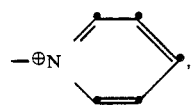

in which Z is hydrogen, halogen or .

preferably hydrogen, and $R_{15}$ is $-OR_{16}$, in which $R_{16}$ is $C_1$-$C_4$-alkyl or phenyl, or $-NH-R_{17}$ or

in which $R_{18}$ is $C_1$-$C_4$-alkyl, $R_{19}$ is $C_1$-$C_4$-alkyl or phenyl or $R_{18}$ and $R_{19}$ together the complement to a morpholine, piperidine, piperazine, pyrrolidine or

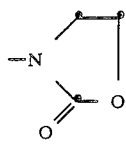

ring and $R_{17}$ is hydrogen, $C_1$-$C_4$-alkyl, phenyl-($C_1$-$C_4$)-alkyl, cyclohexyl, cyclohexyl-($C_1$-$C_4$)-alkyl, benzoyl, naphthyl or a group of the formula

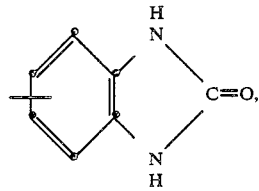

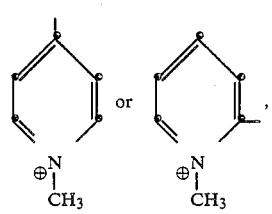

where $R_{20}$ is hydrogen, halogen, $C_1$-$C_4$-alkyl or $C_1$-$C_4$-alkoxy, $R_{21}$ is hydrogen, halogen, $C_1$-$C_4$-alkyl, $C_1$-$C_4$-alkoxy, —NHCO-alkyl($C_1$-$C_4$) or —SO$_2$NH$_2$, $R_{22}$ is hydrogen, halogen, $C_1$-$C_4$-alkyl of $C_1$-$C_4$-alkoxy and $R_{23}$ is hydrogen or halogen, in particular those in which at least one of the radicals $R_{21}$, $R_{22}$ and $R_{23}$ is different from hydrogen and $C_1$-$C_4$-alkyl.

Preference is given in particular to those compounds the formula of the formula (I) in which A is the complement to a ring of the formula

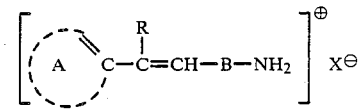

B is 1,4-phenylene, Z is hydrogen and $R_{15}$ is —NH—$R'_{17}$ in which $R'_{17}$ is benzoyl, naphthyl,

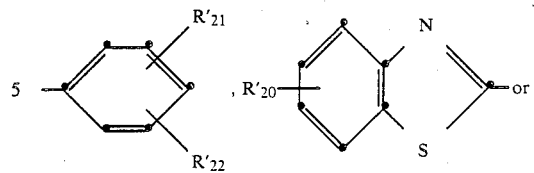

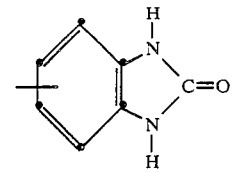

where $R'_{21}$ is $C_1$-$C_4$-alkoxy or NHCO—($C_1$-$C_4$)-alkyl and $R'_{22}$ is hydrogen, $C_1$-$C_4$-alkyl or $C_1$-$C_4$-alkoxy and $R'_{20}$ is hydrogen or $C_1$-$C_4$-alkoxy.

It will be readily understood that the radicals of acetoacetic acid derivatives can be written in various tautomeric forms, for example

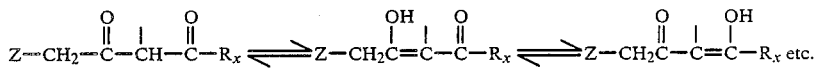

If one of these forms is used, this of course means that all possible tautomeric forms are included.

The anions $X^\ominus$ in the compounds of the formula (I) can be in the case customary colourless organic and inorganic anions; examples are: chloride, bromide, iodide, hydroxyl, hydrogensulfate, sulfate, nitrate, dihydrogen phosphate, hydrogenphosphate, phosphate, carbonate, methosulfate, ethosulfate, acetate, propionate, benzenesulfonate, toluenesulfonate, formate, lactate, oxalate and methoxyacetate; but it is possible for mixtures of various anions to be present.

The charge on the methine-azo compounds of the formula (I) according to the invention is by definition cationic. Since these compounds can also contain anionic groups such as SO$_3$H and COOH groups, the compounds are subject to the condition that the total number of all cationic and basic groups is greater by at least 1 than the total number of all anionic groups.

The methine-azo compounds of the formula (I) according to the invention are prepared in known manner, for example by diazotising a methine compound of the formula $$\left[ \overset{R}{\underset{A}{\bigcirc}} C-C=CH-B-NH_2 \right]^{\oplus} X^{\ominus}$$

and coupling onto a coupling component HKK, the general symbols being as defined in formula (I).

The diazotisation and the coupling reaction are carried out in conventional manner, advantageously in an aqueous, acid or weakly alkaline medium.

The methine-azo compounds according to the invention obtained are isolated from the reaction medium in conventional manner, or the process of preparation is conducted in such a way that a ready-to-use, concentrated solution is obtained at once.

If the compound is isolated, the isolated paste is dried or directly turned into the desired solution.

The coupling components H-KK are known or can be obtained in known manner. Attention is drawn to the coupling components KK mentioned at the beginning.

The methine compounds of the formula

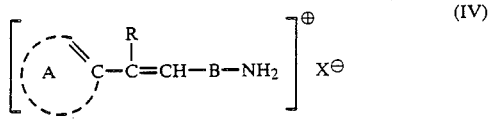 (IV)

are partly known (see for example: DE-A-2,161,413; Zhurnal Obshchei Khimii, Vol. 43, No. 8, p. 1789–1794 Aug. 4, 1973; U.S. Pat. No. 3,185,538, U.S. Pat. No. 3,192,195, FR-A-No. 1,391,408, DE-A-No. 1,248,192), or can be prepared known manner.

These compounds are obtained for example when quaternary salts of the formula

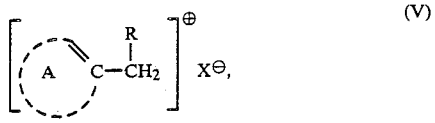 (V)

in which A, R and X are as defined above, are condensed with substituted or unsubstituted aminobenzaldehydes or aminonaphthaldehydes or derivatives thereof (for example immonium salts).

The condensation is carried out at temperatures between 20° and 140° C., preferably between 50° and 110° C., in an organic solvent. Examples of suitable solvents are alcohols, such as methanol, ethanol and propanols and butanols, and also benzylalcohol, ethyl acetate, methyl benzoate, formic acid, acetic acid, $C_2$–$C_5$-glycols, dimethylformamide, dimethylacetamide, tetramethylurea, acetonitrile and benzonitrile. To speed up the condensation reaction it is possible to add basic catalysts, for example triethylamine, pyridine, piperidine, N-ethylpyridine, N-methylmorpholine, alkali metal carbonates, alkali metal acetates and acetates of inorganic or organic nitrogen bases, such as ammonium acetate or piperidine acetate.

The quaternary salts of the formula V are known or can be prepared in known manner.

The free amino group of the aminoaldehydes can optionally be protected before the condensation by means of an acetyl group which is subsequently split off again by acid hydrolysis.

However, the methine-azo compounds according to the invention can also be prepared by, for example, first diazotising an aminobenzaldehyde or aminonaphthaldehyde of the formula

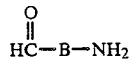

and coupling onto the coupling component KK-H and condensing the resulting azo compound of the formula

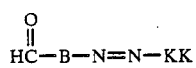

with a quaternary salt of the formula (V). The preferred reaction conditions for the condensation correspond to those described above for the preparation of compounds of the formula (IV). The diazotisation and coupling is effected in known manner.

The methine-azo compounds of the formula (I) are used in particular as dyes for dyeing and printing cationically dyeable substrates, such as wool, silk, leather, acid-modified nylon materials, polyacrylonitrile materials, basically dyeable, modified polyester materials, natural and regenerated cellulose materials, such as cotton and viscose, on which these compounds have good affinity and produce brilliant dyeings which have good fastness properties; they are distinguished in particular by their high tinctorial strength.

A preferred use of the methine-azo dyes of the formula (I) acording to the invention lies in the dyeing of paper of all kinds, especially bleached, unsized and sized lignin-free paper. The compounds are very particularly suitable for dyeing unsized paper (tissues) owing to their very high standard affinity for this substrate.

The methine-azo compounds according to the invention exhaust very readily onto these substrates, leaving the waste waters colourless, which is a great technical and ecological advantage, in particular in regard to present day waste water legislation. The high degree of exhaustion is also of advantage for good shade reproducibility. The degree of exhaustion is not affected by the hardness of the water. The dyeings on paper are distinguished in particular by their tinctorial strength, lightfastness and high affinity; they do not tend to bleed when dyed paper in the wet state is brought into contact with moist white paper. This property is particularly desirable for tissues where it is foreseeable that the dyed paper in the wet state (for example soaked with water, alcohol or surfactant solution) will come into contact with other surfaces, for example made of textiles or paper, which need to be protected against soiling.

The high affinity for paper and the high rate of dyeing of the methine-azo dyes according to the invention is of great advantage for the continuous dyeing of paper and thus makes possible a very wide use.

The methine-azo dyes are used not only as powder or granulate preparations but also in the form of concentrated solutions. Powder preparations are used in conventional manner together with standardising materials such as sodium sulfate, sodium phosphate, sodium chloride or sodium cetate in the presence of dedusting agents, or the methine-azo dyes are made commercially available in the form of spray-dried preparations. Concentrated solutions can be of the aqueous or organic-/aqueous kind, customary additives, such as organic acids, for example acetic acid, formic acid or lactic acid, amides such as formamide, dimethylformamide or urea, alcohols such as glycol, diglycol, diglycol ether, especially methyl or ethyl ether, being preferred.

An example of a favourable composition of such liquid preparations is:

100 parts of a methine-azo compound of the formula (I),

1–100 parts of an organic acid such as formic, acetic, lactic or citric acid,

100–800 parts of water and

0–500 parts of a solubiliser (for example glycols such as diethylene glycol, triethylene glycol, glycol ethers such as methyl cellosolve, methyl carbitol, butyl polyglycol, urea, formamide, dimethylformamide).

The following examples illustrate the invention and the preparation of the starting materials in more detail. Parts and percentages are by weight, unless otherwise stated.

(A) STARTING MATERIALS
EXAMPLE 1

(a) 85.8 g of N-methyl-4-methylpyridinium chloride and 103.1 g of 4-acetaminobenzaldehyde are suspended at room temperature in 720 ml of isopropanol. 10 ml of piperidine are added, and the mixture is refluxed for 2 hours. The mixture is then cooled down with stirring to room temperature and is finally also cooled in an ice bath. The yellowish brown crystal mass is then filtered off with suction and washed with a total of 150 ml of cold isopropanol. Drying leaves 155 g of a yellow crystalline powder.

(b) 57.7 g of the powder obtained in (a) are refluxed for 1 hour in a solution of 200 ml of water and 200 ml of 32% hydrochloric acid. The resulting yellow solution, after cooling down, is standardised with water to a weight of 493 g. This solution is used in this form for diazotisation, and contains the compound of the formula

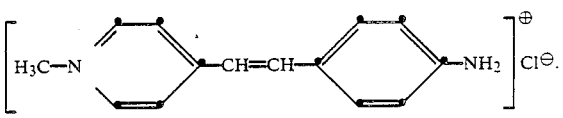

EXAMPLES 2–14

Example 1 is repeated, except that in Example 1(a) the N-methyl-4-methylpyridinium chloride is replaced by the quaternary salts listed in column II of Table 1. The products indicated in column III are obtained.

TABLE 1

| I Example | II Quaternary salts | III Products R = —CH=CH—⟨C₆H₄⟩—NH₂ |
|---|---|---|
| 2 | 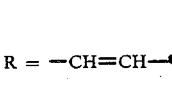 | 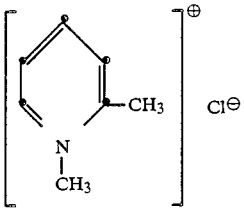 |
| 3 | 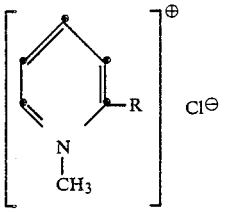 | 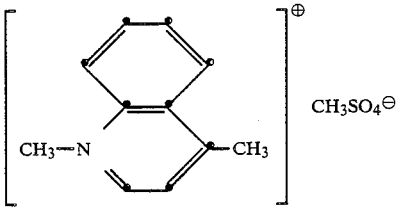 |
| 4 | 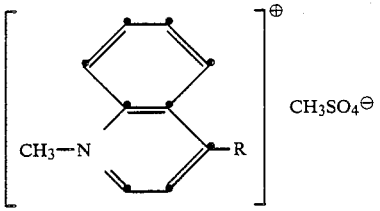 | 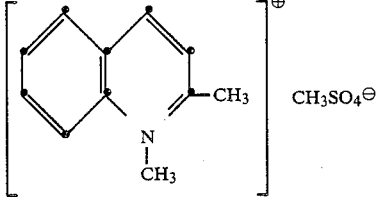 (present as suspension) |
| 5 | 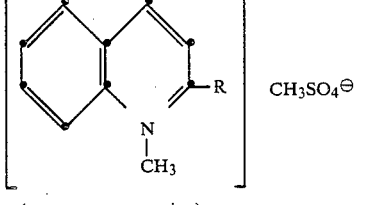 | 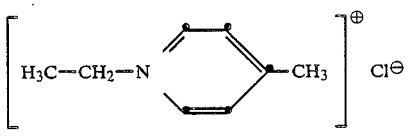 |
| 6 | 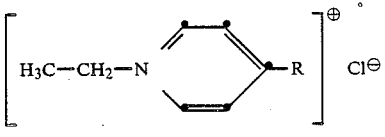 | 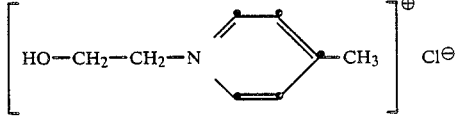 |

TABLE 1-continued
| Example | Quaternary salts | Products R =  |
|---|---|---|
| 7 | 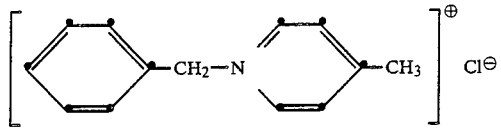 | 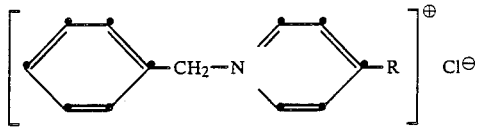 |
| 8 | 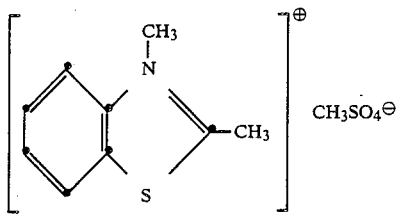 | 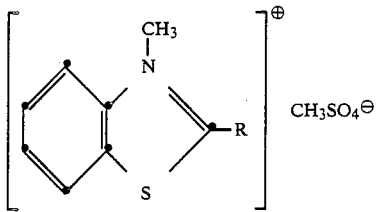 |
| 9 | 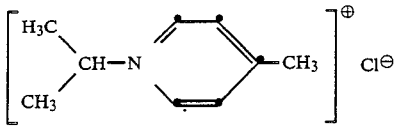 | 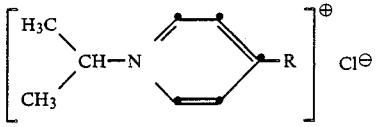 |
| 10 | 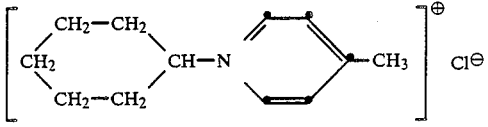 | 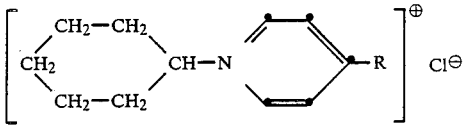 |
| 11 | 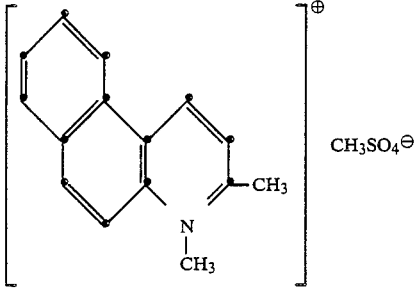 | 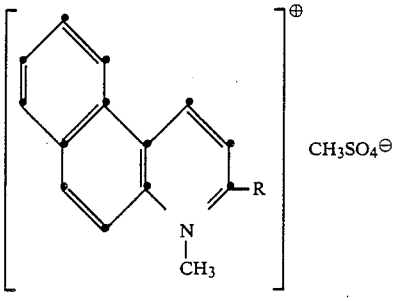 |
| 12 | 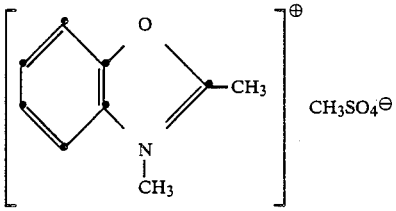 | 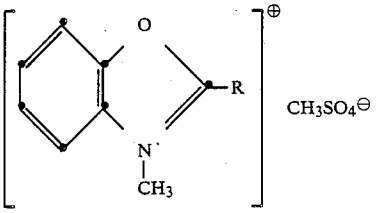 |
| 13 | 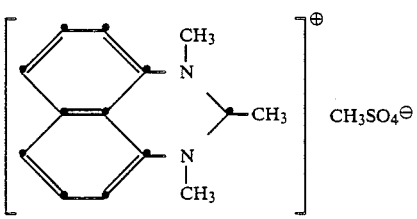 | 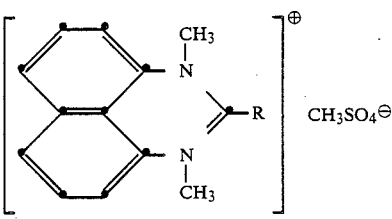 |

TABLE 1-continued

| | | III |
|---|---|---|
| | | Products R = —CH=CH—⟨benzene⟩—NH₂ |
| I Example | II Quaternary salts | |
| 14 | 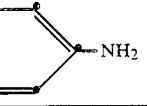 | 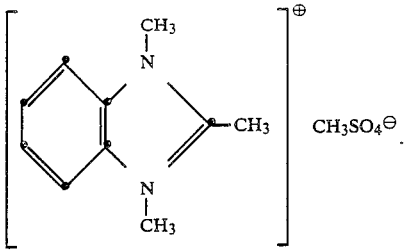 |

EXAMPLE 15

24.5 g of the hydrochloride of chlorinated Fischer base (1,2,3,3-tetramethyl-5-chloroindolenine) and 17.3 g of 4-acetaminobenzaldehyde are refluxed for 1 hour in 750 ml of n-butanol. The deep red solution is concentrated in a rotary evaporator to a volume of about 200 ml, and after cooling down about 600 ml of ether are added to precipitate the product. The precipitated product is filtered off, washed with ether and dried. This gives 41.3 g of a red powder. The powder is refluxed for 1 hour in 400 ml of water and 400 ml of concentrated hydrochloric acid. Cooling down is followed by filtration, washing with water and drying.

This gives 22.15 g of the starting material of the formula

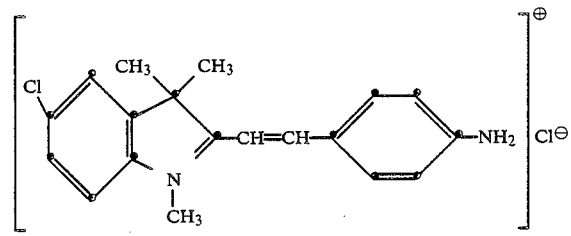

EXAMPLE 16

The method of Example 15 is used to convert the Fischer base into the compound of the formula

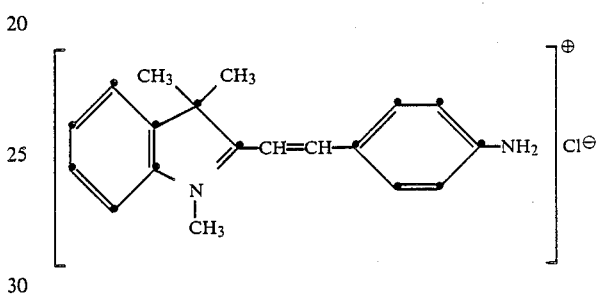

EXAMPLE 17

47.5 g of 4-picoline, 150 ml of isopropanol and 81.3 g of phenacyl chloride are heated to 150° C. in an autoclave for 3 hours. After cooling down, the brown suspension is filtered and the filter cake is thoroughly washed with ether. Drying leaves 113 g of a beige crystalline powder.

49.5 g of this powder are refluxed for 32 hours in 240 ml of isopropanol together with 34.3 g of 4-acetaminobenzaldehyde and 3.5 ml of piperidine. Cooling down in an ice bath is followed by filtration and wsshing of the residue with a little isopropanol. The residue is recrystallised from 300 ml of n-butanol; this gives 44.6 g of a reddish brown powder.

19.6 g of this powder are dissolved in 50 ml of hot glacial acetic acid, and 50 ml of water and 50 ml of 32% hydrochloric acid are then added. One hour under reflux is followed by stirring until cold, subsequent cooling in an ice bath, filtration and washing with a little cold water. Drying leaves 9.3 g of the compound of the formula

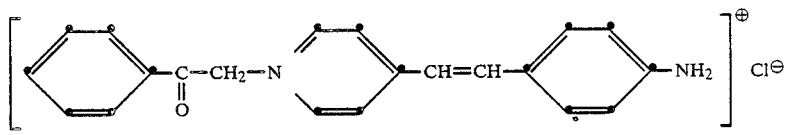

EXAMPLE 18

5.5 g of N-methyl-4-methylpyridinium chloride, 5 g of 2-aminobenzaldehyde and 0.65 ml of piperidine are refluxed in 75 ml of isopropanol for 5 hours. About 70 ml of solvent are then distilled off during a further hour. The cold, oily residue has gradually added to it, dropwise and with stirring, 400 ml of acetone, and the mixture is stirred overnight. The residue is filtered off and redissolved in 20 ml of methanol, the solution is clarified by filtration, and the product is reprecipitated with 1 liter of acetone. The precipitated residue is filtered and dried. This gives 4.5 g of the compound of the formula

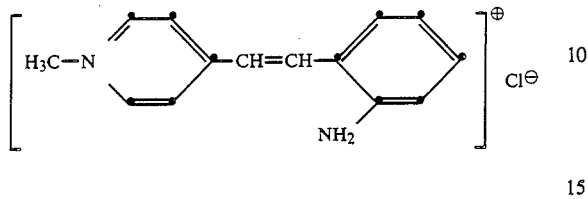

(B) END PRODUCTS
EXAMPLE 19

12.8 g of the solution described in Example 1b are cooled down to 0°–5° C. and are diazotised with 5.0 ml of 1 N sodium nitrite solution. After ½ hour of stirring at 0°–5° C. any excess nitrite is destroyed with a little sulfamic acid. The result is a yellow solution.

This diazo solution is added to 1.1 g of acetoacet-2-chloroanilide dissolved in 30 ml of a mixture of dimethylformamide and water in a ratio of 1:1. The result is a pale orange-yellow solution. The solution is then brought to about pH 4–5 with crystalline sodium acetate, and the dye precipitates in crystalline form. This is followed by stirring at room temperature for 2 hours, filtration and washing with 5% NaCl solution. Drying gives the compound of the formula

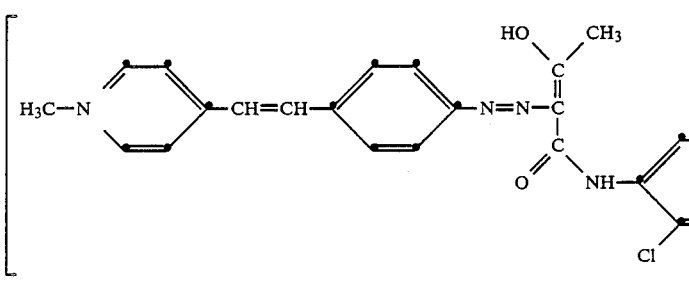

in the form of a yellow powder which is very readily watersoluble and is highly suitable for dyeing paper and polyacrylonitrile in slightly greenish-yellow shades.

EXAMPLES 20–50

Example 19 is repeated, except that the coupling components indicated in column II of Table 2 below are used, affording compounds of the formula:

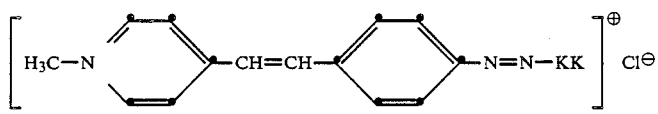

the shade of which on paper and polyacrylonitrile is indicated in column III.

TABLE 2

| I Example No. | II H—KK (R = CH$_3$COCH$_2$CO—) | III Shade |
|---|---|---|
| 20 | R—NH—⟨C$_6$H$_4$⟩—Cl | yellow |
| 21 | R—NH—⟨C$_6$H$_3$(CH$_3$)⟩—Cl | yellow |
| 22 | R—NH—⟨C$_6$H$_3$(CH$_3$)⟩—Cl | yellow |
| 23 | R—NH—⟨C$_6$H$_3$Cl⟩—Cl | yellow |
| 24 | R—NH—⟨C$_6$H$_4$⟩—OCH$_3$ | yellow |
| 25 | R—NH—⟨C$_6$H$_3$(OCH$_3$)⟩—OCH$_3$ | golden yellow |

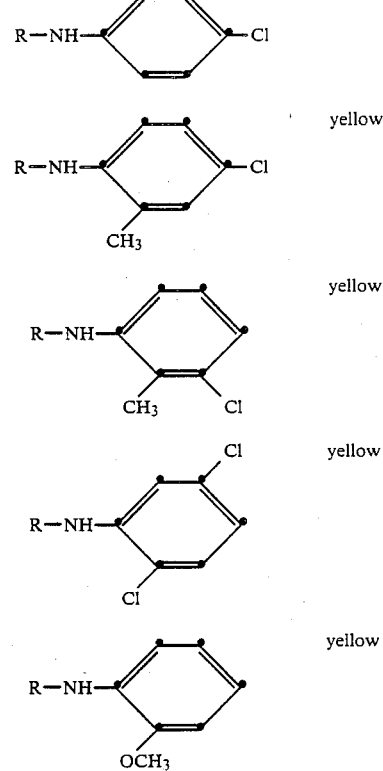
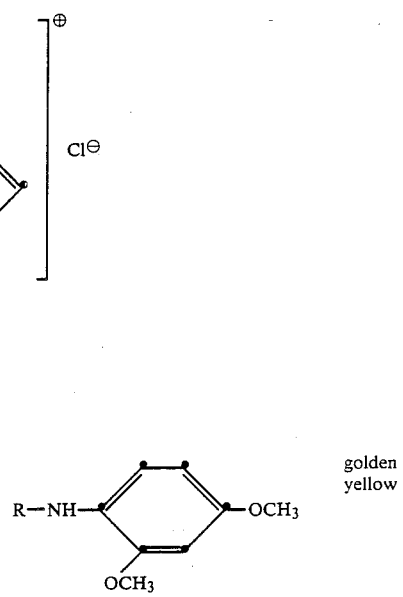

TABLE 2-continued

| I Example No. | II H—KK (R = CH₃COCH₂CO—) | III Shade |
|---|---|---|
| 26 | R—NH-[2,5-dimethoxyphenyl] (OCH₃ at 2 and 5) | yellow |
| 27 | R—NH-[4-(NHCOCH₃)phenyl] | yellow |
| 28 | R—NH-[4-OCH₃ phenyl] | yellow |
| 29 | R—NH-[2-Cl, 4-OCH₃, 5-OCH₃ phenyl] | yellow |
| 30 | R—NH-[4-OC₂H₅ phenyl] | yellow |
| 31 | R—NH-[2-OC₂H₅, 4-Cl, 5-OC₂H₅ phenyl] | reddish yellow |
| 32 | R—N(CH₃)-phenyl | yellow |
| 33 | R—NH-[benzothiazol-2-yl] | yellow |
| 34 | R—NH-[6-methylbenzothiazol-2-yl] | yellow |
| 35 | R—NH-[6-ethoxybenzothiazol-2-yl] | yellow |
| 36 | R—NH₂ | yellow |
| 37 | R—NH-[naphthyl] | yellow |
| 38 | R—NH-[4-SO₂NH₂ phenyl]* | yellow |
| 39 | R—NH-[2,5-dimethylphenyl fused to NH—C(=O)—NH ring]** | yellow |
| 40 | R—NH-[benzothiazol-2-yl]-5-OCH₃ | yellow |
| 41 | R—NH—CH₂-[phenyl] H | yellow |
| 42 | R—NH—CH₂-[phenyl] | yellow |
| 43 | R—NH-[phenyl] H | yellow |
| 44 | R—N(morpholino) | yellow |
| 45 | R—N(succinimido) | yellow |
| 46 | R—NH—C(=O)-[phenyl] | greenish yellow |
| 47 | R—OCH₂-[phenyl] | yellow |

TABLE 2-continued

| I Example No. | II H—KK (R = CH₃COCH₂CO—) | III Shade |
|---|---|---|
| 48 | 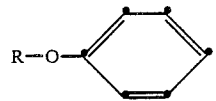 | yellow |
| 49 | | reddish yellow |
| 50 | 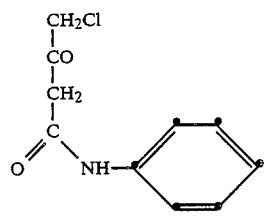 | yellow |

*Melting point: 194–198° C.
**Melting point: 225–230° C.

EXAMPLE 51

The compound of Example 1b is diazotised, and the diazo solution is poured onto a solution of 1.27 g of malodianilide (U.S. Pat. No. 3,252,968) in 30 ml of dimethylformamide. The temperature is maintained at 15°–20° C. and the pH is adjusted with anhydrous sodium acetate to 5. This is followed by stirring at room temperature for 2 hours, subsequent addition of 30 ml of water, filtration and washing with water. Drying leaves 1.75 g of the dye of the formula

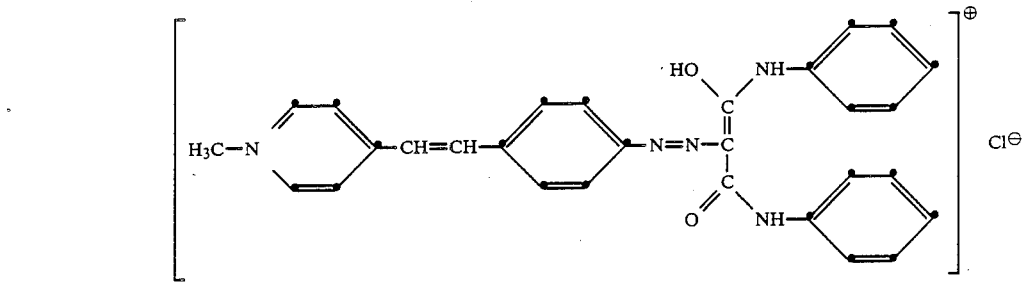

with which paper can be dyed in a brilliant reddish yellow shade. Melting point of the dye: 210°–215° C.

EXAMPLE 52

Example 19 is repeated, except that the starting compound of Example 1 is replaced by the starting compound of Example 5, affording the compound of the formula

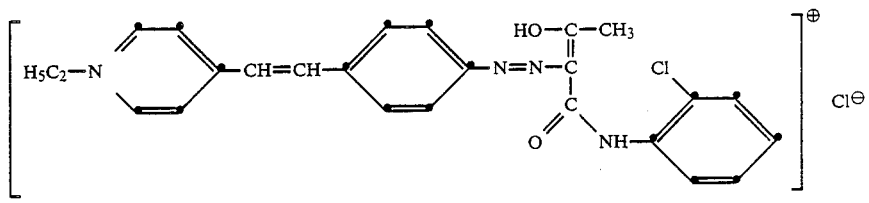

It dyes paper in a yellow shade which is a trace redder than the corresponding dye to Example 19.

EXAMPLE 53

Example 19 is repeated, except that the starting compound of Example 1 is replaced by the starting compound of Example 6, affording the compound of the formula

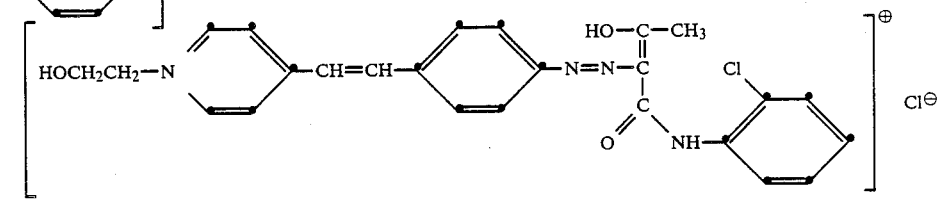

It dyes paper in a yellow shade which is again a trace redder than that of the dye of Example 52.

EXAMPLE 54

Example 19 is repeated, except that acetoacet-2-chloroanilide is replaced by 0.8 g of acetoacetdiethylamide dissolved in 10 ml of water and 0.8 ml of 32% hydrochloric acid, affording 3.1 g of the dye of the formula

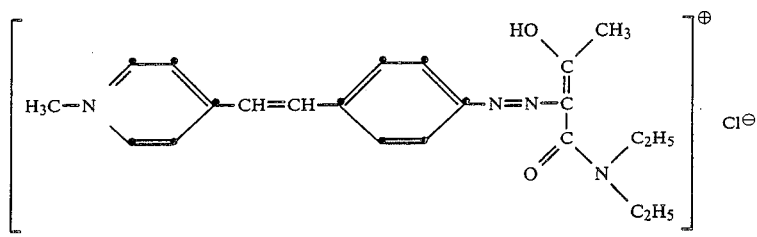

This dye dyes polyacrylonitrile in a brilliant greenish yellow shade.

EXAMPLES 55–68

If in Examples 20, 19, 22, 24, 33, 27, 28, 25, 26, 37, 30, 39, 40 and 46 the starting material of Example 1(b) is in each case replaced by the starting material of Example 2, this gives the dyes of the formula

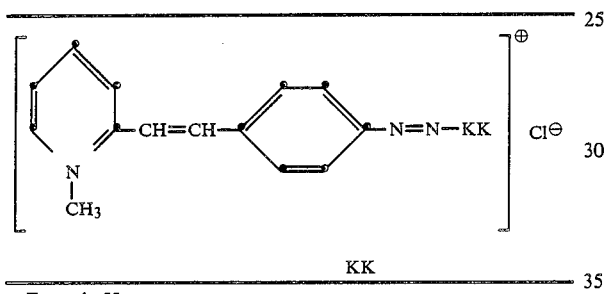

| | KK |
|---|---|
| Example 55 | 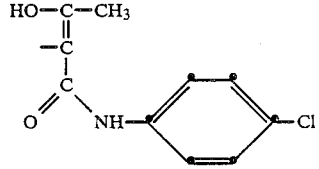 |
| Example 56 | 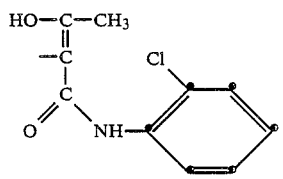 |
| Example 57 | 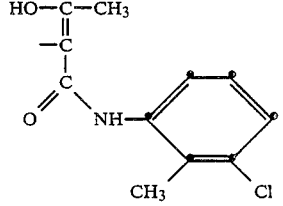 |
| Example 58 | 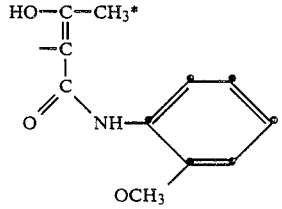 |

*Melting point: 244–248° C.

-continued

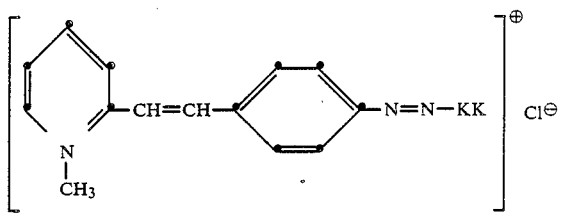

| | KK |
|---|---|
| Example 59 | 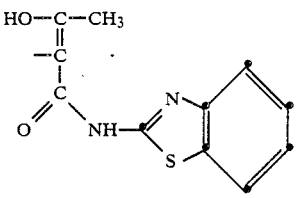 |
| Example 60 | 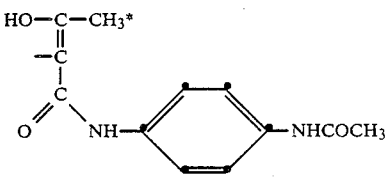 |
| Example 61 | 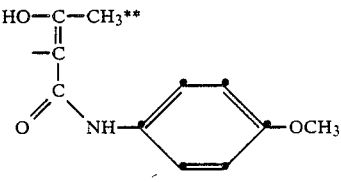 |
| Example 62 | 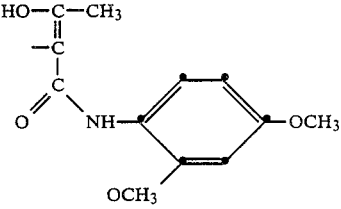 |
| Example 63 | 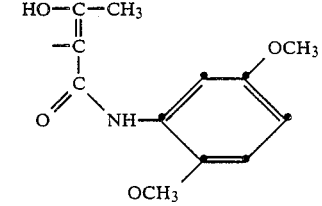 |

-continued

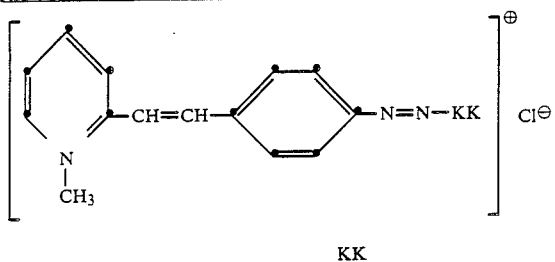

| KK |
|---|
| Example 64 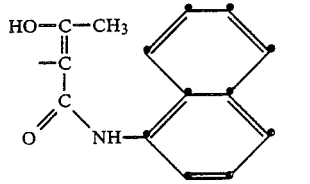 |
| Example 65 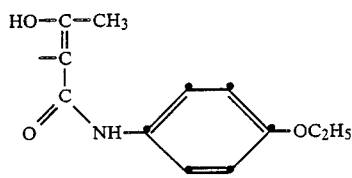 |
| Example 66 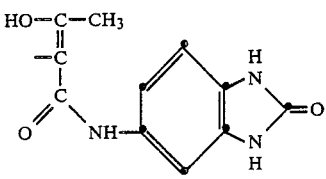 |

-continued

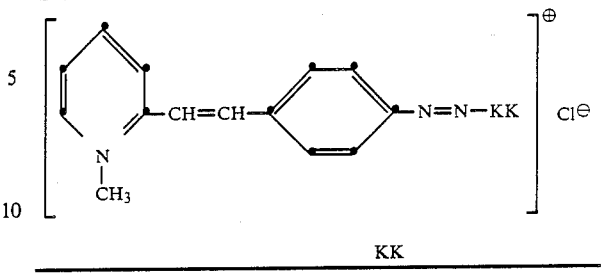

| KK |
|---|

*Melting point: 114–118° C.
**Melting point: 180–185° C.

The shade of these products on paper is slightly hypsochromically shifted compared with the analogous 4-picoline dyes.

EXAMPLE 69

19.1 g of the hydrochloric acid suspension obtained in Example 4 are briefly brought to the boil and turn into a solution. The solution is poured onto 25 g of ice, the mixture is additionally cooled in an ice bath, and 5 ml of 1 N sodium nitrite solution are added. After half an hour of stirring at 0°–5° C. virtually everything is dissolved. This diazo is clarified by filtration through glass wool and is poured to a solution of 0.9 g of acetoacetanilide dissolved in 30 ml of dimethylformamide and 30 ml of water. The pH is adjusted with crystalline sodium acetate to 4–5, followed by stirring at room temperature for 2 hours. The very fine suspension is filtered and is washed with 5% NaCl solution. This gives 2.4 g of the dye of the formula

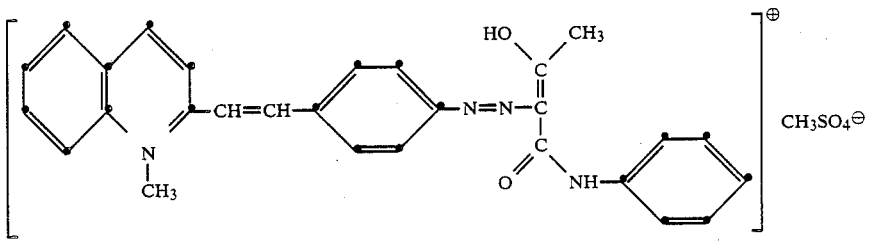

| Example 67 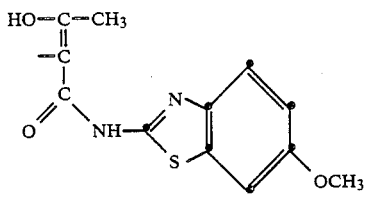 |
|---|
| Example 68 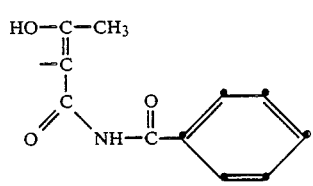 |

Melting point: 210°–220° C.

This dye dyes paper in an unusually brilliant yellow-orange shade. The shade produced on polyacrylonitrile is a pure fluorescent golden yellow.

EXAMPLE 70

Example 69 is repeated, except that the starting material of Example 4 is replaced by the suspension of the starting material of Example 3 and 20 g of sodium chloride are added before filtration, affording 1.6 g of the dye of the formula

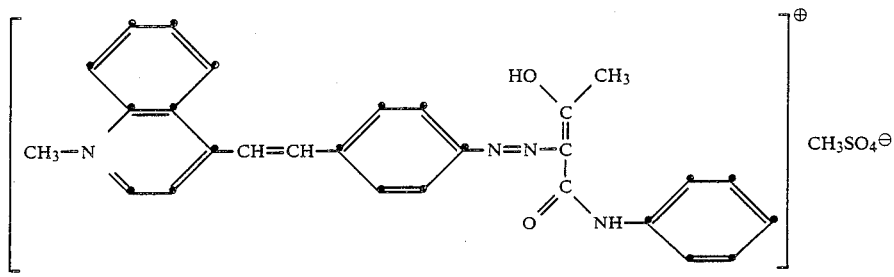

(Melting point: 165°–170° C.) which dyes both and polyacrylonitrile in a fluorescent orange shade which is slightly more bathochromic than the dye of Example 69.

EXAMPLE 71

Example 70 is repeated, except that the acetoacetanilide is replaced by 2,4-dimethoxyacetoacetanilide, affording the dye of the formula

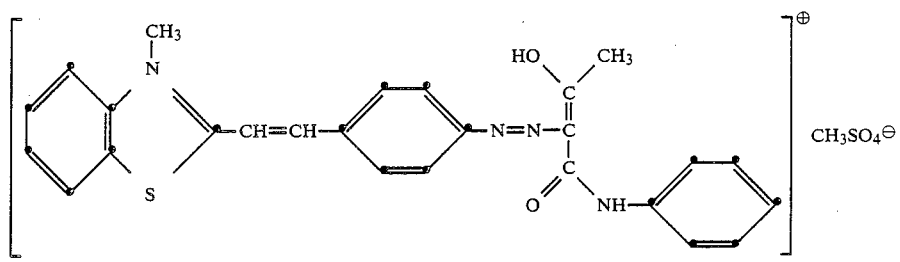

which dyes paper in a brownish orange shade.

EXAMPLE 72

19.5 g of a hydrochloric acid suspension as described in Example 9 are diluted with 45 ml of water, and at 0°–5° C. 5 ml of 1 N sodium nitrite solution are added; this is followed by 3 hours of stirring at 0°–5° C.; the result is an orange-yellow solution. This solution is poured into a solution of 0.9 g of acetoacetanilide in 15 ml of dimethylformamide and 15 ml of water, and the pH is adjusted with crystalline sodium acetate to 4–5. This is followed by stirring at room temperature for a further hour, filtration and washing with 5% NaCl solution. Drying leaves 2.6 g of the dye of the formula

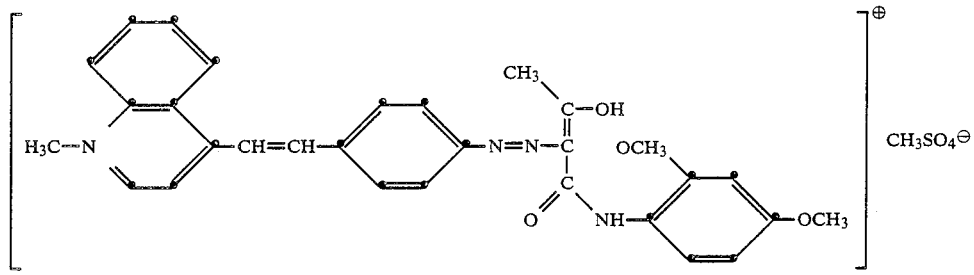

which dyes paper in a bright orange.

EXAMPLE 73

Example 69 is repeated, except that the starting material of Example 4 is replaced by the starting material of Example 11, affording the dye of the formula

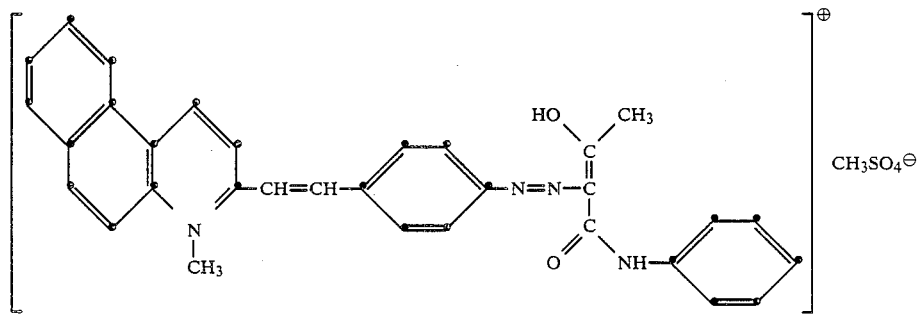

which dyes 1 polyacrylonitrile in a bright orange shade.

EXAMPLE 74

2.8 g of the starting material of Example 13a are diazotised in conventional manner in 50 ml of water and 2.25 ml of 30% hydrochloric acid with sodium nitrite. The diazo solution is added to a solution of 1.44 g of acetoacet-o-anisidide dissolved in 20 ml of dimethylformamide and 20 ml of water, and the pH is adjusted with sodium acetate to 5.2. This is followed by stirring for 3 hours, filtration, washing with a little 5% sodium chloride solution and drying. This gives 4.1 g of the compound of the formula

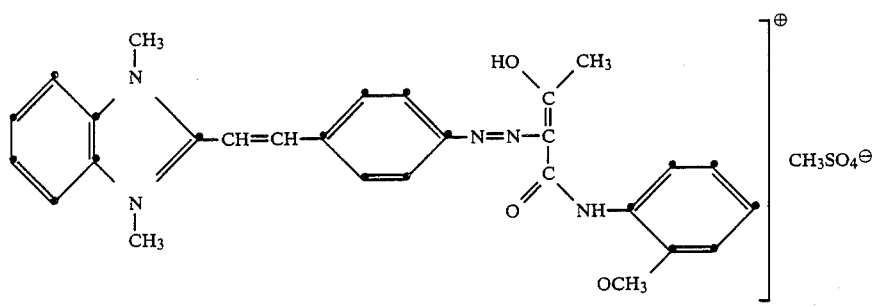

which dyes paper in a bright yellow shade having excellent fastness properties.

EXAMPLE 75

1.21 g of 4-aminobenzaldehyde (prepared in accordance with DE-A-86,874) are suspended in 15 ml of water and 3 ml of 30% hydrochloric acid. After cooling down to 0°–5° C. 1 N sodium nitrite solution are added after 30 minutes of stirring the diazo solution is clarified by filtration and is added to a solution of 2.12 g of acetoacet-o-anisidide in 30 ml of dimethylformamide and 30 ml of water. After some minutes an orange-yellow precipitate forms. The pH is then adjusted with sodium acetate to 4.5. This is followed by stirring for half an hour, filtration and washing with plenty of water. Drying leaves 2.6 g of the compound of the formula

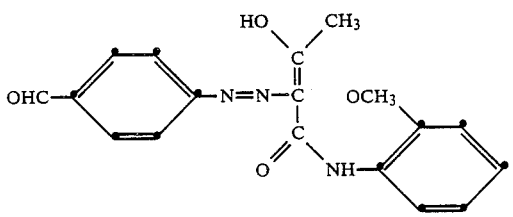

as a yellow powder. It is readily recrystallised from n-butanol 1.7 g of this powder and 1.15 g of the hydrochloride of the Fischer base are refluxed in 25 ml of n-butanol for 5 hours. The dark orange-red solution produces a precipitate on cooling down. This precipitate is filtered off with suction and washed with butanol. Drying leaves 1.9 g of the compound of the formula

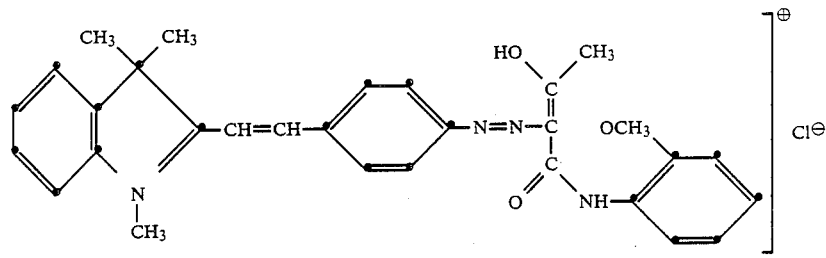

(melting point 225°–228° C.) which dyes paper in a brilliant orange having good fastness properties.

EXAMPLE 76

0.2 g of the dye prepared in Example 24 is pasted up with 2 g of 40% aqueous acetic acid and then dissolved by addition of 4000 ml of hot water. 1 g of sodium acetate and 2 g of an adduct, quaternised with dimethyl sulfate, of 15 to 20 equivalents of ethylene oxide on N-octadecyldiethylenetriamine are added, and 100 g of polyacrylonitrile fabric are entered at 60° C. The bath is raised to 100° C. in the course of 30 minutes, and dyeing is then carried out at the boil for 90 minutes. The liquor is then allowed to cool down to 60° C. in the course of 30 minutes. The material thus dyed is then removed and subsequently rinsed with lukewarm and cold water. The polyacrylonitrile fabric has been dyed a greenish yellow. The dyeing has a good light fastness.

EXAMPLE 77

A polyacrylonitrile copolymer consisting of 93% acrylonitrile and 7% vinyl acetate is dissolved in 15% strength in dimethylacetamide. The spinning liquid is extruded into a spin bath which consists of 40% dimethylacetamide and 60% water. The resulting tow is subsequently stretched by known methods and rinsed with hot and cold water to remove dimethylacetamide.

This wet tow is dyed by dipping into a bath at 42° C. of the following composition:

4.5 g/l dye of Example 33
pH 4.5 with acetic acid.

The contact time between tow and dyeing liquor is 3–5 seconds. The excess dyeing liquor is subsequently squeezed off and the tow is fed into the dryer. The result is a yellow tow having good fastness properties.

EXAMPLE 78

A print paste is prepared to consist of:
10 g of the dye obtained as described in Example 26, 30 g of thiodiglycol,
20 ml of 80% acetic acid,
350 ml of boiling water,
500 g of carob bean flour thickening,
30 g of tartaric acid,
15 g of di-(β-cyanethyl)-formamide and
30 g of a naphthalenesulfonic acid/formaldehyde condensation product.

A polyacrylonitrile fabric printed with this print paste is then fixed at 101 to 103° C. in an HT festoon ager in the course of 20 to 30 minutes and is finished in conventional manner. The result obtained is a yellow print.

EXAMPLE 79

A paper web of bleached beech sulfite (22° SR.) is prepared on a continuous laboratory paper machine. An aqueous solution of the dye of Example 60 is continuously metered under conditions of high turbulence into the thin stuff 10 seconds ahead of the head box (0.2% dye, liquor ratio 400:1, water hardness: 10° German hardness, pH 6, temperature 20° C.).

The result is a greenish yellow shade on the paper web. The waste water is completely colourless.

EXAMPLE 80

50 g of chemically bleached beech sulfite are mixed with 50 g of bleached spruce sulfite (freeness: 22° SR) and 0.2 g of the dye of Example 39 in water (pH 6, water hardness 10° German hardness, temperature 20° C., liquor ratio 40:1). After stirring for 15 minutes, sheets of paper are prepared on a Frank sheet-former.

The paper has been dyed a very deep greenish yellow shade. The waste water is completely colourless. The degree of exhaustion is practically 100%. The wet fastness properties are excellent.

If in Examples 76–80 the remaining compounds of Examples 19–75 are used as dyes, this likewise produces good and fast dyeings on the respective substrates.

I claim:
1. A methine-azo compound of the formula

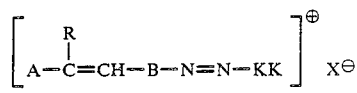

in which A is a ring of the formula

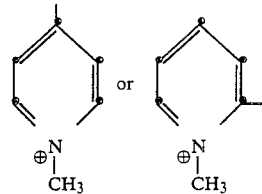

R is hydrogen,
B is 1,4-phenylene,
KK is a radical of the formula

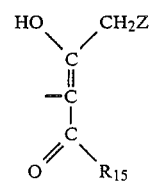

in which
Z is hydrogen,
$R_{15}$ is —NH—$R'_{17}$ in which $R'_{17}$ is benzoyl, naphthyl,

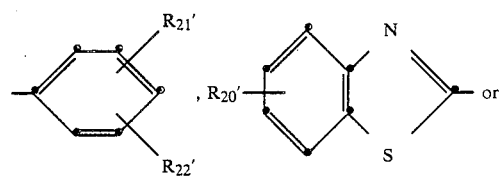

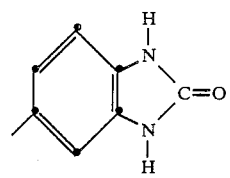

where $R'_{21}$ is $C_1$-$C_4$-alkoxy or NHCO—($C_1$-$C_4$)-alkyl and $R'_{22}$ is hydrogen, $C_1$-$C_4$—alkyl or $C_1$-$C_4$—alkoxy and $R'_{20}$ is hydrogen or $C_1$-$C_4$—alkoxy, and $X^{\ominus}$ is an anion.

* * * * *